Patented Sept. 26, 1922.

1,430,045

UNITED STATES PATENT OFFICE.

HENRY M. WHEELWRIGHT, OF NEWTON CENTER, MASSACHUSETTS.

BEATER SIZING.

No Drawing. Application filed May 6, 1919, Serial No. 295,060. Renewed March 3, 1922. Serial No. 540,920.

*To all whom it may concern:*

Be it known that I, HENRY M. WHEELWRIGHT, a citizen of the United States, residing at 205 Dudley Road, Newton Center, in the county of Middlesex and State of Massachusetts, have invented new and useful Improvements in Beater Sizing, of which the following is a specification.

Beater or engine sizing, which in paper manufacture means rosin-alum sizing, is a complex process influenced by many factors and the efficiency is low.

The principal object of the present invention is to provide a method of sizing by which the efficiency of the rosin will be greatly increased, and therefore the quantity of rosin required very materially reduced. This is accomplished by providing means by which the rosin is precipitated in the beater in substantially a colloidal condition thus obtaining the maximum sizing effect. The rosin-alum compounds are thus precipitated into the finest possible state of subdivision, and are therefore spread out over the fibres to the fullest extent.

It is common practice to make rosin size by mixing soda ash with water, adding the rosin in suitable proportions and boiling for four or five hours in a jacketed vessel. The rosin size thus produced is diluted with water and then added to the beater.

The proportion of soda ash varies according as the manufacturer wishes to saponify all the rosin present or only a portion, the free rosin being emulsified in the rosin soap.

Prepared rosin size is an article of commerce and is generally sold as containing a definite percentage of free and combined rosin.

The rosin sizes containing 25 to 30% free rosin and over are more difficult to dilute in water without danger of flocculation of the rosin and mechanical means such as atomizers working on the injector principle are generally used to make down these acid sizes.

When ordinary corn starch is boiled, with say, ten to twenty times its weight of water it gives a jelly, from which, on dilution with water the starch hydrate precipitates. It can be shown that fully half of the starch comes out of solution on dilution with water.

The reason for this is that the starch granula is not homogeneous but consists of a series of layers including a central substance. The outer layers consist of "hemicellulose" the inner substance being known as "granulose." On boiling starch with water the outer layers hydrate and swell up and the granules burst, the inner substance or granulose also now hydrated, going into solution. If the solution is now diluted with cold water, allowed to stand an hour or so, a sediment consisting of the hydrated outer layers of the starch granules settles to the bottom. This comprises over 50% of the actual weight of the starch and only the "granulose" is left in solution. This latter has very low colloidal properties and thus the fact that the starch solution is not a homogeneous colloid explains its failure in inducing colloidal precipitation in the beater.

If the rosin size is mixed with a true vegetable colloid before adding to the beater colloidal precipitation takes place. It can be demonstrated that if a 2% solution of rosin size in water is precipitated with alum, in an equally dilute solution, the precipitate when examined on the microscope, consists of particles or flakes of a definite size but if the rosin is precipitated under similar conditions in the presence of a true colloid no particles can be identified even on the microscope, the precipitate appearing as a continuous jelly.

I have found that certain modified starches such as feculose, which is a starch acetate or ester of definite composition, effect this colloidal precipitation. The preferred way of carrying out the method is to prepare the rosin size in the usual way but using only about half to three-quarters as much as has been usual heretofore and mixing it with not over 20% of modified starch such as "feculose" which has been previously boiled with six to eight times its weight of water.

The mixed rosin size and feculose size is then diluted with water and added to the paper stock in the beater. It is to be understood that the feculose is boiled with water to produce a homogeneous colloidal size before it is mixed with the rosin size and if sodium silicate is being used it is advisable to add this to the mixed size rather than to the beater separately.

After the rosin size has been thoroughly incorporated with the paper stock in the beater, alum is added to the beater as is common practice. It is to be noted that owing to feculose being a starch acetate the admixture of an alkaline compound such as rosin size has the effect of developing the jellying power of the combined starch owing to slight decomposition of the starch acetate. Alum has also a thickening effect on feculose, so that this particular produce is unique in that all the chemicals with which it comes in contact in the process have the effect of further developing its jellying or colloidal power.

I do not wish to be limited to the use of feculose or starch acetate as I find that other so-called soluble starches or modified or converted starches can be used in this process with similar results. The effect, however, with these starches differs in degree and in some the colloid properties are very low.

By my method the starch product and rosin are thoroughly mixed before adding to the beater. I have found in practice that by carrying out this process of adding to the rosin size sufficient feculose or other suitable modified starch so that there shall be 15 to 20% dry feculose calculated to the dry rosin, that the efficiency of the rosin is practically doubled and thus an important advance is made in the technique of rosin sizing.

On account of the doubling of the rosin efficiency only half the quantity heretofore needed is now required to accomplish substantially the same result, and not only so, but only half of the alum subsequently added is now required and is thereby saved.

The percentage of saving of rosin, of course, will vary with various types of paper and the efficiency of the present methods of sizing. The lowest saving effected so far is a 25% saving and the highest saving 66%.

Although I have described a preferred embodiment of the invention and only minor modifications thereof I am aware of the fact that the invention can be carried out with modifications in the manner of procedure without departing from the scope of this invention as expressed in the claims. Therefore I do not wish to be limited in these respects, but what I do claim is:—

1. The method of engine sizing paper which consists in mixing previously boiled soluble modified starch with rosin size, diluting it, and mixing it with the pulp in the beater to assist in the precipitation of the rosin in a colloidal condition in the beater and reduce the amount of rosin necessary.

2. The method of sizing paper during its manufacture which consists in mixing converted boiled modified starch with rosin size, applying it to the paper pulp in the beater, and adding alum, whereby the precipitation of the rosin by the alum in a colloidal condition will be attained.

3. The method of sizing paper which consists in treating the pulp in the beater with a mixture of rosin size and feculose.

4. The method of sizing paper which consists in mixing with the pulp a previously mixed composition of rosin size and from 18 to 20% feculose to assist in precipitating the rosin in a colloidal form.

5. The method of sizing paper which consists in treating the paper pulp in the beater with a mixture of rosin size and not over 20% of previously boiled modified starch and additional silicate of sodium and subsequently adding alum.

6. The method of engine sizing paper which comprises mixing the paper pulp in the beater with a mixture of rosin size and of previously boiled modified starch to an amount not over 20% of the amount of rosin when in dry condition.

In testimony whereof I have hereunto affixed my signature.

HENRY M. WHEELWRIGHT.